US008159325B2

(12) United States Patent
Suzuki

(10) Patent No.: US 8,159,325 B2
(45) Date of Patent: Apr. 17, 2012

(54) WIRELESS REMOTE CONTROL SIGNAL TRANSFER METHOD AND APPARATUS, AND WIRELESS REMOTE CONTROL SYSTEM

(75) Inventor: Kenji Suzuki, Iwata (JP)

(73) Assignee: Yamaha Corporation, Hamamatsu-shi (JP)

( * ) Notice: Subject to any disclaimer, the term of this patent is extended or adjusted under 35 U.S.C. 154(b) by 1017 days.

(21) Appl. No.: 11/712,617

(22) Filed: Mar. 1, 2007

(65) Prior Publication Data

US 2007/0229299 A1 Oct. 4, 2007

(30) Foreign Application Priority Data

Mar. 7, 2006 (JP) ................................ 2006-061784

(51) Int. Cl.
*H04B 1/20* (2006.01)

(52) U.S. Cl. ..................... 340/4.42; 340/12.22; 341/176

(58) Field of Classification Search ........................ None
See application file for complete search history.

(56) References Cited

U.S. PATENT DOCUMENTS

| | | | | |
|---|---|---|---|---|
| 5,565,855 | A * | 10/1996 | Knibbe | 340/3.51 |
| 6,781,518 | B1 * | 8/2004 | Hayes et al. | 340/825.72 |
| 7,450,852 | B2 * | 11/2008 | Calhoon | 398/106 |
| 7,522,222 | B2 * | 4/2009 | Sato et al. | 348/734 |
| 2004/0155809 | A1 * | 8/2004 | Eyer | 341/176 |
| 2005/0280551 | A1 * | 12/2005 | Hesdahl et al. | 340/825.69 |

* cited by examiner

*Primary Examiner* — Jennifer Mehmood
*Assistant Examiner* — Brian Wilson
(74) *Attorney, Agent, or Firm* — Pillsbury Winthrop Shaw Pittman LLP

(57) ABSTRACT

In response to continuous operation of an operation key on a remote control transmitter, the transmitter repetitively transmits a corresponding remote control signal with a predetermined cyclic period. The signal is received and analyzed by a remote control receiver and transmitted via a wired transmission path to a remote control re-transmitter. Then, the signal is re-transmitted by the re-transmitter via the wired transmission path. Due to a low transmission speed of the transmission path, the transmission path can not transmit all data of the remote control signal to the re-transmitter. Thus, until the next data are received from the transmission path, the re-transmitter interpolates the remote control signal based on the last data, and repetitively transmits the interpolated signal with the predetermined cyclic period.

6 Claims, 7 Drawing Sheets

PRIOR ART

WIRELESS REMOTE CONTROL SIGNAL TRANSFER METHOD AND APPARATUS, AND WIRELESS REMOTE CONTROL SYSTEM

BACKGROUND OF THE INVENTION

The present invention relates to a wireless remote control signal transfer method and apparatus and wireless remote control system which transfer a wireless remote control signal, transmitted from an wireless remote control transmitter, to to-be-operated-equipment (hereinafter referred to as "operated equipment") via a wired transmission path so as to remote-control the operated equipment, and more particularly to a technique for achieving a corresponding function of the operated equipment responsive to so-called "continuous depressing operation" on the remote control transmitter.

Among audio reproduction systems known today are ones of the type where an reproduction apparatus, including for example a CD player, amplifier, etc., is positioned in a single room and speaker cables connected to the reproduction apparatus are laid in a plurality of rooms so that audio signals can be audibly reproduced in the individual rooms. Example of such an audio reproduction system is disclosed in Japanese Patent Application Laid-open Publication No. 2003-45166.

FIG. 2 shows an example general system setup employed for remote-controlling a reproduction apparatus from individual rooms in the aforementioned audio reproduction system. Infrared remote control system 10 of FIG. 2 includes an infrared remote control transmitter 12 and infrared remote control receiver 14 positioned in a room A, and an infrared remote control re-transmitter 16 and operated equipment (i.e., reproduction apparatus) 18 positioned in another room B. The infrared remote control receiver 14 and infrared remote control re-transmitter 16 are connected with each other via a wired transmission path 20. The operated equipment 18 is constructed to operate by directly receiving an infrared remote control signal 22 transmitted from the infrared remote control transmitter 12. In this infrared remote control system 10, however, the operated equipment 18 can not be directly operated or controlled by the infrared remote control transmitter 12 because the infrared remote control transmitter 12 and operated equipment 18 are positioned in the different rooms A and B. Thus, in the system of FIG. 2, the infrared remote control receiver 14 and infrared remote control re-transmitter 16 are provided in the room A and B, respectively, and these receiver 14 and re-transmitter 16 are connected with each other via the wired transmission path 20, comprising an electric cable or optical cable, to thereby constitute an infrared remote control signal transfer apparatus 26. With such an infrared remote control signal transfer apparatus 26, the infrared remote control signal 22 of the infrared remote control transmitter 12 can be transferred to the operated equipment 18 via the infrared remote control signal transfer apparatus 26.

Namely, in the infrared remote control system 10, the infrared remote control transmitter 12 transmits an infrared remote control signal 22 responsive to or corresponding to user's operation of an operation key, such as a push button. The infrared remote control receiver 14 receives the infrared remote control signal 22 from the transmitter 12, analyzes a train of bits of the received control signal 22 and transmits code analysis data (e.g., data obtained by directly converting the bit train into numerical values) 23 to the wired transmission path 20. The infrared remote control re-transmitter 16 receives the code analysis data 23 from the transmission path 20, reproduces an infrared remote control signal 24 (i.e., signal corresponding to the infrared remote control signal 22 transmitted from the infrared remote control transmitter 12) by modulating the bit train, corresponding to the code analysis data 23, with a predetermined carrier wave and then transmits the reproduced infrared remote control signal 24. The operated equipment 18 receives and analyzes the infrared remote control signal 24 and performs a process corresponding to the result of the analysis (i.e., process instructed by the infrared remote control transmitter 12).

Among various operational functions by the conventionally-known infrared remote control transmitters is the so-called "continuous depression function", which is intended to cause desired operated equipment to perform a special function in response to a user continuously performing one particular operation (i.e., "continuous depressing operation") on the infrared remote control transmitter. For example, the continuous depression function can be used as a function to gradually increase a volume-up (i.e., volume-increasing) or volume-down (volume-decreasing) speed of an amplifier in accordance with the passage of time, if the user continues to depress a volume-up or volume-down button on the infrared remote control transmitter. The continuous depression function can also be used as a function to gradually increase a fast-forwarding or fast-rewinding speed of an amplifier in accordance with the passage of time, if the user continues to depress a fast-forward or fast-rewind button of a CD player or video player via the infrared remote control transmitter.

If the user continues to depress any one of the buttons of the infrared remote control transmitter in order to perform the continuous depression function, the infrared remote control transmitter repetitively transmits an infrared remote control signal, corresponding to the depressing operation, with a predetermined cyclic frame period as long as the button is depressed. During that time, the operated equipment detects that the infrared remote control signal is repetitively received from the transmitter with the predetermined cyclic period and thereby determines that a continuous depression function is being instructed, so that it performs a predetermined process, preset set as the continuous depression function of the depressed button, as long as the reception of the infrared remote control signal lasts.

The infrared remote control system 10 of FIG. 2 can be constructed in such a manner that transmission of the code analysis data 23 of the infrared remote control signal 22 and other data (e.g., audio signal data) is carried out simultaneously using the wired transmission path 20. In such a case, a plurality of data are subjected to multiplexing (such as time-division multiplexing or frequency multiplexing), and the resultant multiplexed data are transmitted to the wired transmission path 20. Because the transmission of the code analysis data 23 is carried out utilizing an empty time or empty band, it may sometimes become impossible to secure a sufficient speed for transmission of the code analysis data 23.

Let it be assumed here that the infrared remote control signal 22 transmitted from the infrared remote control transmitter 12 has a frame length T0 that is, for example, 108 msec. and that a time T1 is required to transmit, via the wired transmission path 20, the code analysis data 23 of one frame of the infrared remote control signal 22. If the user performs continuous depressing operation on the infrared remote control transmitter 12, the transmitter 12 repetitively transmits, as the infrared remote control signal 22, code data C0, C1, C1, . . . (here, C0 is an operation code and C1 is a repeat code) or code data C0, C0, C0, . . . with a cyclic period equal to the frame length T0. If, during that time, the operated equipment 18 has received the next code (i.e., repeat code C1 or same code as the last operation code C0) within a time period $T0+\alpha$ (α is a leeway time preset in view of possible variation or difference in time management between different operated equipment) after the beginning of the reception of the operation code C0, the operated equipment 18 determines that the same operation key is being continuously operated. If, on the other hand, the operated equipment has not received the next code within the time period T0+α, the operated equipment 18 normally determines that the key operation has been terminated. Thus, in a case where T1>T0+α, even if continuous depressing operation has been performed by the user on the infrared remote control transmitter 12, the infrared remote control re-transmitter 16 can not transmit an infrared remote control signal 22 of the next code within the time period T0+α following the transmission of the infrared remote control signal 22 of the leading operation code C0. As a result, the operated equipment 18 can not detect the continuous depressing operation, and thus, it can not perform a process corresponding to the continuous depressing operation.

SUMMARY OF THE INVENTION

In view of the foregoing, it is an object of the present invention to provide an improved wireless remote control signal transfer method and apparatus and wireless remote control system which, even where a transmission speed of a wired transmission path is relatively low, allows operated equipment to perform a function corresponding to continuous depressing operation on an wireless remote control transmitter.

In order to accomplish the above-mentioned object, the present invention provides an improved wireless remote control signal transfer method, which comprises: a reception step of receiving an wireless remote control signal repetitively transmitted by an wireless remote control transmitter with a first cyclic period while one given operation is being continuously performed on the wireless remote control transmitter; a step of analyzing the wireless remote control signal, received by the reception step, to provide code analysis data of the wireless remote control signal and repetitively transmitting the code analysis data of the wireless remote control signal to a wired transmission path with a second cyclic period, longer than the first cyclic period, as long as the reception of the wireless remote control signal lasts with the first cyclic period; a re-transmission step of receiving the code analysis data from the wired transmission path and repetitively re-transmitting an wireless remote control signal, corresponding to the received code analysis data and also representing the wireless remote control signal transmitted by the wireless remote control transmitter, with the first cyclic period as long as the reception of the code analysis data lasts with the second cyclic period; and a step of causing the wireless remote control signal, re-transmitted by the re-transmission step, to be received by operated equipment (such as a reproduction apparatus) remote-controlled by the wireless remote control signal transmitter.

According to another aspect of the present invention, there is provided an improved wireless remote control signal transfer apparatus including an wireless remote control receiver, an wireless remote control re-transmitter, and a wired transmission path interconnecting the wireless remote control receiver and the wireless remote control re-transmitter. Here, the wireless remote control receiver receives an wireless remote control signal repetitively transmitted by an wireless remote control transmitter with a first cyclic period while one given operation is being continuously performed on the wireless remote control transmitter. The wireless remote control receiver also analyzes the received wireless remote control signal to provide code analysis data of the wireless remote control signal and transmits the code analysis data of the wireless remote control signal to the wired transmission path with a second cyclic period, longer than the first cyclic period, as long as the reception of the wireless remote control signal lasts with the first cyclic period. Further, the wireless remote control re-transmitter receives the code analysis data from the wired transmission path and repetitively re-transmits an wireless remote control signal, corresponding to the received code analysis data and also representing the wireless remote control signal transmitted by the wireless remote control transmitter, with the first cyclic period as long as the reception of the code analysis data lasts with the second cyclic period.

Preferably, the wireless remote control receiver transmits, to the wired transmission path every the second cyclic period, the code analysis data of the wireless remote control signal received immediately before transmission, of the code analysis data, to the wired transmission path.

Preferably, while the wireless remote control re-transmitter is continuously receiving the code analysis data from the wired transmission path with the second cyclic period, the wireless remote control re-transmitter repetitively re-transmits, with the first cyclic period and a particular number of times, an wireless remote control signal, corresponding to newest received code analysis data and also representing the wireless remote control signal transmitted by the wireless remote control transmitter, within a particular time period prior to receipt of next code analysis data and following re-transmission of the wireless remote control signal based on the code analysis data received immediately before the newest received code analysis data. The "particular number of times" corresponds, at a maximum, to a quotient obtained by diving the second cyclic period by the first cyclic period.

Preferably, while one given operation is being continuously performed on the wireless remote control transmitter and when the wireless remote control re-transmitter has received the code analysis data of an operation code of a leading frame of an wireless remote control signal of a type where a repeat code is repetitively transmitted in and after a second frame following the operation code of the leading frame, the wireless remote control re-transmitter re-transmits the operation code in a leading frame and repetitively re-transmits the repeat code in and after a second frame. Further, while one given operation is being continuously performed on the wireless remote control transmitter and when the wireless remote control re-transmitter has received the code analysis data of an operation code of the leading frame of an wireless remote control signal of a type where an operation code is repetitively transmitted in all frames, the wireless remote control re-transmitter re-transmits the operation code in all frames.

According to still another aspect of the present invention, there is provided an improved wireless remote control system, which comprises: an wireless remote control transmitter that transmits an wireless remote control signal responsive to operation by a user; an wireless remote control receiver that analyzes the wireless remote control signal, transmitted by the wireless remote control transmitter, to provide code analysis data of the wireless remote control signal and transmits the code analysis data of the wireless remote control signal to a wired transmission path; an wireless remote control re-transmitter that receives the code analysis data transmitted to the wired transmission path and transmits an wireless remote control signal, corresponding to the received code analysis data and also representing the wireless remote control signal transmitted by the wireless remote control transmitter; and operated equipment to be remote-controlled via the wireless remote control transmitter, the operated equipment analyzing the wireless remote control signal transmitted by the wireless remote control re-transmitter and performing a process corresponding to an analysis result of the wireless remote control signal. Here, while one given operation is being continuously performed on the wireless remote control transmitter and when the wireless remote control receiver has received an wireless remote control signal repetitively transmitted by the wireless remote control transmitter with a first cyclic period, the wireless remote control receiver transmits code analysis data of the wireless remote control signal to the wired transmission path with a second cyclic period longer than the first cyclic period. Further, when the wireless remote control re-transmitter has received the code analysis data transmitted to the wired transmission path, the wireless remote control re-transmitter transmits the wireless remote control signal corresponding to the received code analysis data and also repetitively transmits the wireless remote control signal with the first cyclic period for a time period up to immediately before a predetermined time corresponding to the second cyclic period passes after receipt of the code analysis data.

Preferably, the wireless remote control receiver combines the code analysis data and other data than the code analysis data to thereby provide a multiplexed signal and transmits the multiplexed signal to the wired transmission path, and the wireless remote control re-transmitter extracts the code analysis data from the multiplexed signal received from the wired transmission path.

According to the present invention thus arranged, even where the wired transmission path is capable of only transmitting code analysis data with a cyclic period longer than a cyclic period of an wireless remote control signal repetitively transmitted in response to continuous depressing operation on the wireless remote control transmitter, an wireless remote control signal, representing the wireless remote control signal transmitted by the wireless remote control transmitter, is repetitively re-transmitted for interpolation on the basis of the code analysis data received from the wired transmission path. As a result, the present invention allows the operated equipment to reliably perform a desired process corresponding to the continuous depressing operation.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

The present invention is applicable to a wireless remote control system utilizing radio communication control such as Bluetooth and particularly is useful when applied to an infrared remote control system.

For better understanding of the objects and other features of the present invention, its preferred embodiments will be described hereinbelow in greater detail with reference to the accompanying drawings, in which.

DETAILED DESCRIPTION OF THE INVENTION

Figure 2:
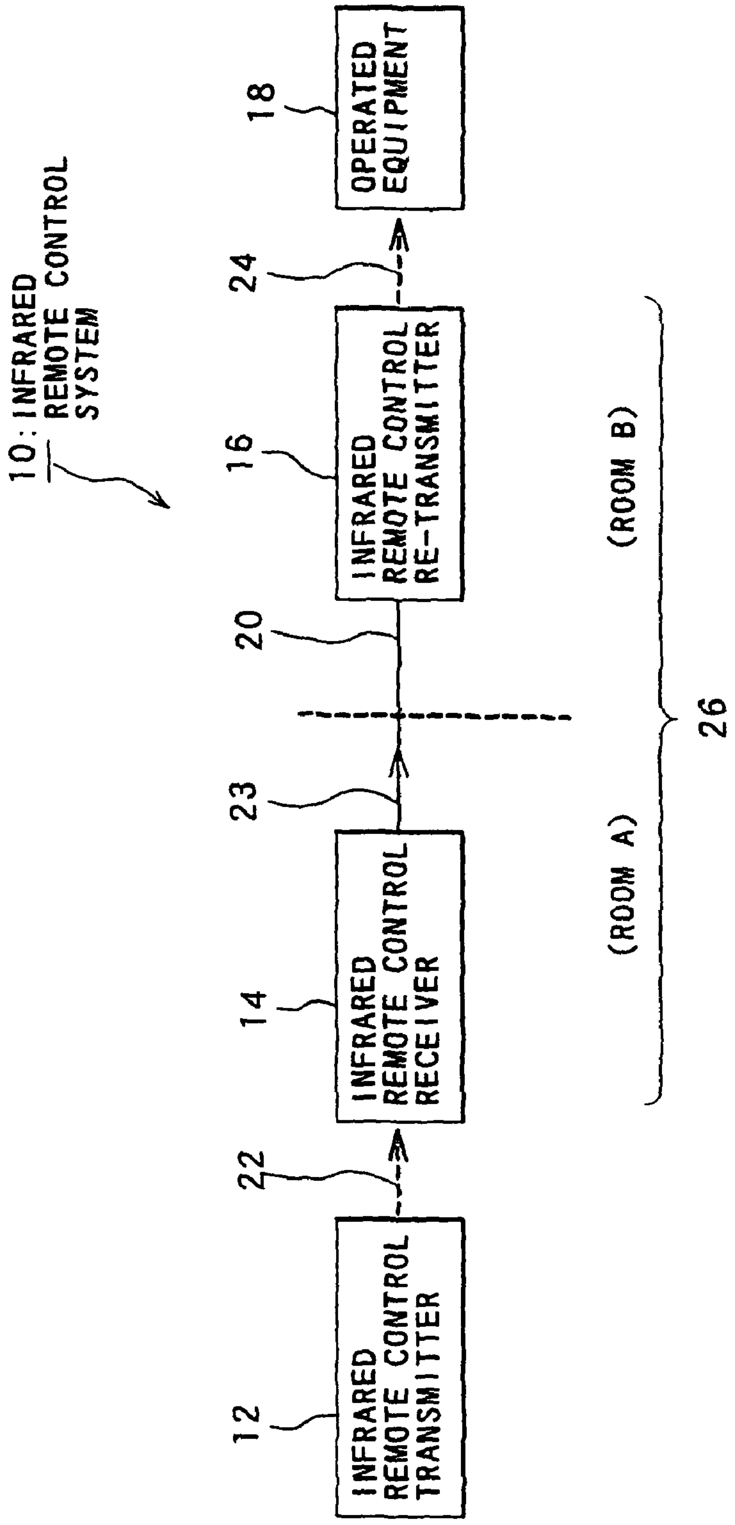
FIG. 2 is a block diagram showing an example general setup of an infrared remote control system to which is applied the present invention.
Figure 3:
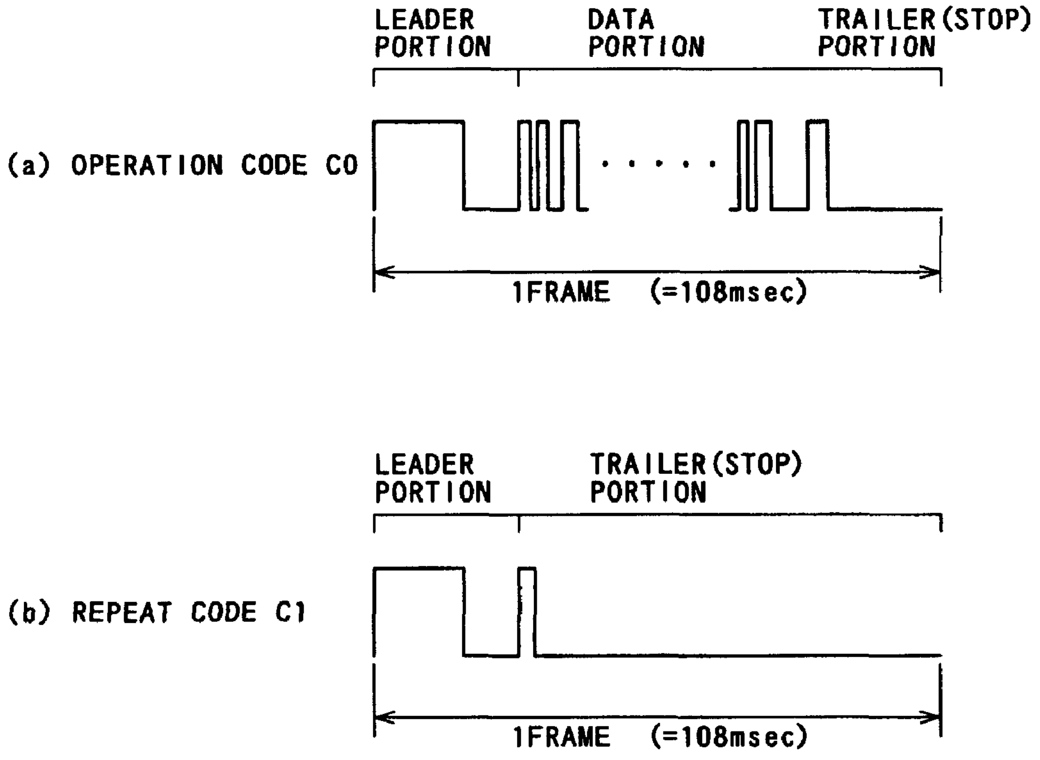
FIG. 3 is a diagram explanatory of an infrared remote control signal.

Now, a description will be given about an embodiment of the present invention in relation to a case where the invention is carried out in the infrared remote control system 10 of FIG. 2. First, an infrared remote control signal 22 transmitted from the infrared remote control transmitter 12 employed in the instant embodiment is explained. If a user operates a desired operation key on the infrared remote control transmitter 12, the transmitter 12 transmits an infrared remote control signal 22 generated by modulating an operation code C0, corresponding to the operated key, with a carrier waveform of a predetermined frequency (e.g., 35 kHz). As shown in (a) of FIG. 3, one frame of the operation code C0 comprises a leader portion, data portion and trailer (or stop) portion. The data portion comprises data corresponding to the operated key. The frame has a length of about 108 msec.

If the user continuously depresses an operation key, corresponding to a continuous depressing operation function, on the infrared remote control transmitter 12, the transmitter 12 repetitively transmits, following the transmission of the leading operation code C0, an infrared remote control signal 22, generated by modulating a repeat code C1 with the aforementioned carrier wave, with the frame period as long as the continuous depressing operation lasts. As shown in (b) of FIG. 3, one frame of the repeat code C1 comprises only a leader portion and trailer (or stop) portion, with no data portion. The infrared remote control transmitter 12 may sometimes be of a type which repetitively transmits the operation code C0 (without transmitting the repeat code C1) even in and after the second frame.

Figure 4:
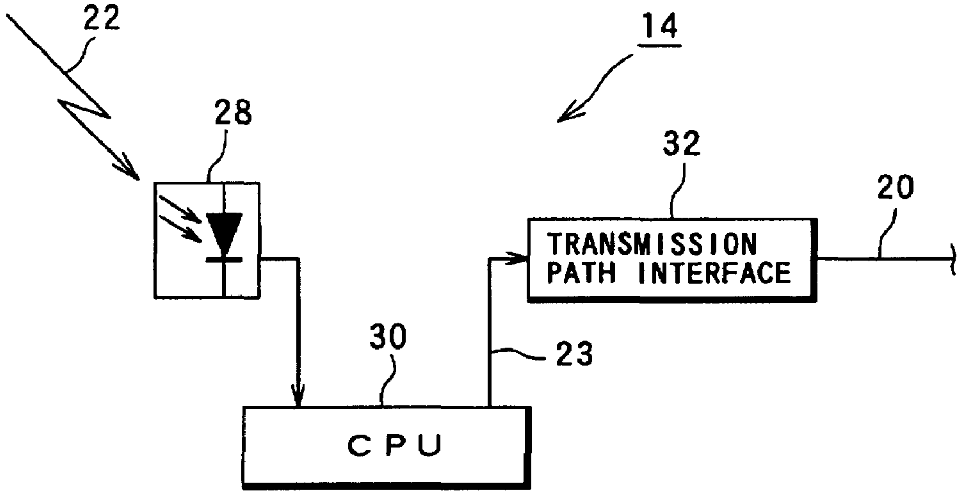
FIG. 4 is a block diagram showing an example construction of an infrared remote control receiver shown in FIG. 2.

FIG. 4 shows an example construction of the infrared remote control receiver 14 employed in the instant embodiment. Infrared receiving unit 28 receives an infrared remote control signal 22 transmitted from the infrared remote control transmitter 12 and demodulates the received signal. Code data (train of bits) obtained by the demodulation are transmitted to a CPU (Central Processing Unit) 30. The CPU 30 converts the code data into numerical value data of several bytes per frame. Specifically, the conversion into the numerical value data is carried out, for example, by dividing the bit train of the code data of each frame into groups each having a predetermined number of bits (e.g., four bits) and converting the code data of each of the divided groups into numerical value data (e.g., hexadecimal numbers).

The numerical value data of each of the frames, generated by the CPU 30, are sent, as code analysis data 23, to a transmission path interface 32. The transmission path interface 32 converts the code analysis data 23 into a format capable of being transmitted via the wired transmission path 20 and then sends the thus-converted code analysis data to the wired transmission path 20. Where the same wired transmission path 20 is used for both transmission of the code analysis data of the infrared remote control signal 22 and transmission of other data (e.g., audio signal data), the transmission path interface 32 mixes (e.g., time-division multiplexes or frequency-multiplexes) the code analysis data of the infrared remote control signal 22 and the other data and then sends the thus-mixed (or multiplexed) data to the wired transmission path 20. The wired transmission path 20 may be in the form of dedicated signal lines (electric cable or optical cable) for transmitting the code analysis data 23, or in the form of indoor power lines for transmitting the code analysis data 23 by the so-called power line communication (PLC) scheme.

Figure 5:
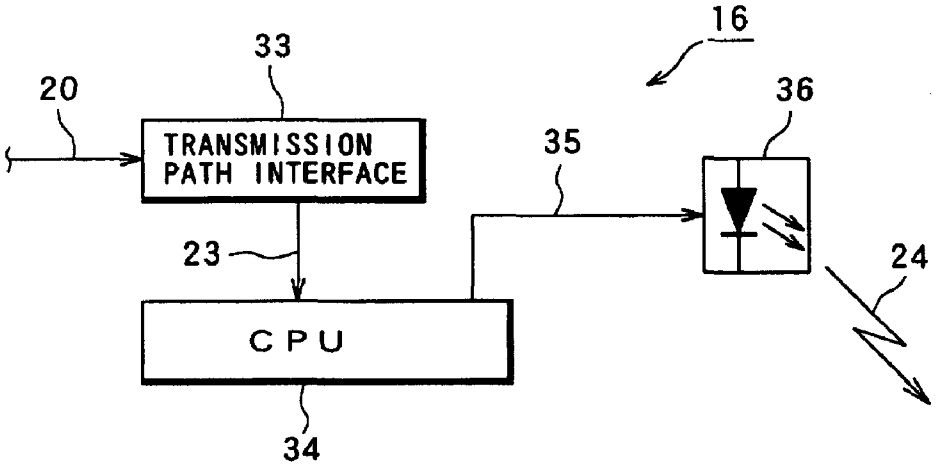
FIG. 5 is a block diagram showing an example construction of an infrared remote control re-transmitter shown in FIG. 2.

FIG. 5 shows an example construction of the infrared remote control re-transmitter 16 employed in the embodiment. Transmission path interface 33 of the re-transmitter 16 receives the signal transmitted via the wired transmission path 20, extracts the code analysis data 23 from the received signal and sends the thus-extracted code analysis data to a CPU 34. In the case where the same wired transmission path 20 is shared for both the transmission of the code analysis data 23 of the infrared remote control signal 22 and the transmission of other data, the transmission path interface 33 separates the code analysis data 23 of the infrared remote control signal 22 and the other data out of the received signal, and then it sends the separated code analysis data 23 of the infrared remote control signal 22 to the CPU 34. The CPU 34 restores corresponding code data (i.e., train of bits) 35 (i.e., the same code data of the operation code C0 or repeat code C1 as those included in the infrared remote control signal 22 transmitted from the infrared remote control transmitter 12) from the code analysis data 23 and sends the restored code data to an infrared emitting unit 36. The infrared emitting unit 36 AM-modulates the code data 35 with a carrier wave of the same frequency of the infrared remote control signal 22 transmitted from the infrared remote control transmitter 12, and it then drives an infrared emitting diode with the modulated signal. As a result, an infrared remote control signal 24, which is identical to the infrared remote control signal 22 transmitted from the infrared remote control transmitter 12, is reproduced and transmitted from the infrared emitting unit 36.

Figure 1:
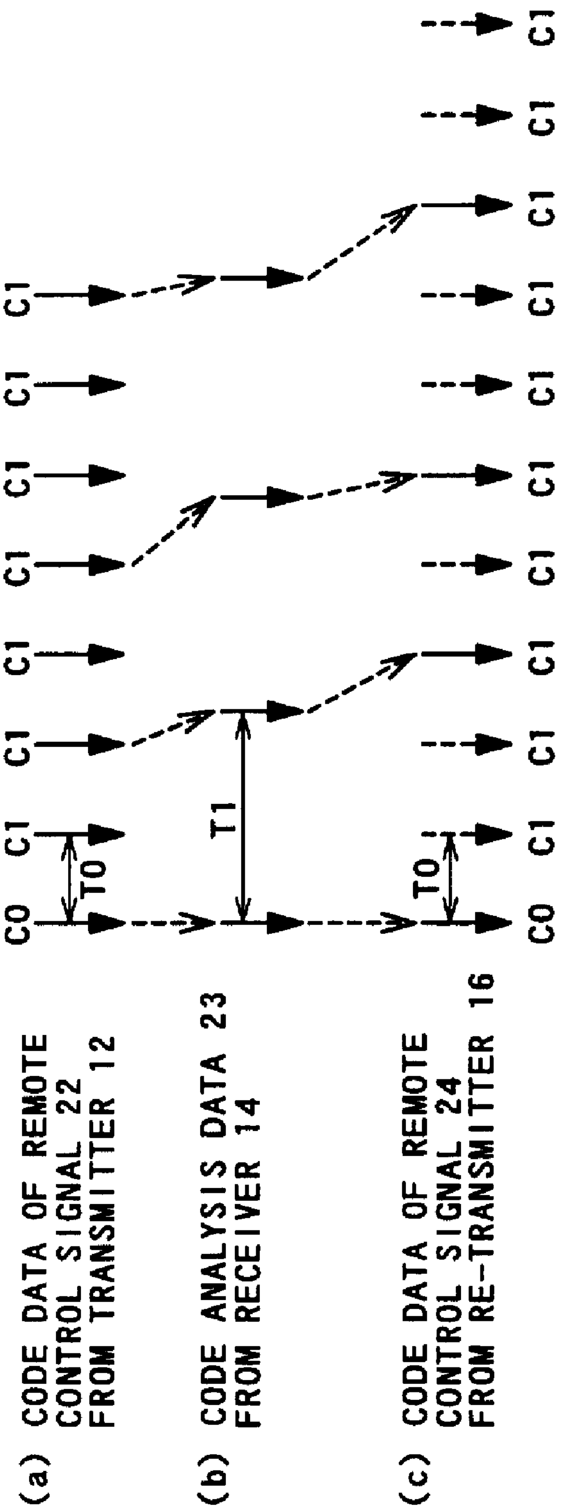
FIG. 1 is a diagram explanatory of behavior based on control of FIGS. 6 and 7 in a case where a pattern of code data transmitted from a remote control transmitter in response to continuous depressing operation is C0, C1, C1, . . .

Next, a description will be given about control performed by the infrared remote control receiver 14 and infrared remote control re-transmitter 16. The following paragraphs first describe a case where the infrared remote control transmitter 12 is of a type which, in response to continuous operation of an continuously-depressable operation key (e.g., volume-up/down button), transmits an infrared remote control signal 22, generated by modulating code data C0, C1, C1, . . . as shown in (a) of FIG. 1, with a predetermined cyclic period (i.e., first cyclic period of, for example, 108 msec.) T0, as shown in (a) of FIG. 1, as long as the continuous depressing operation lasts.

Figure 6:
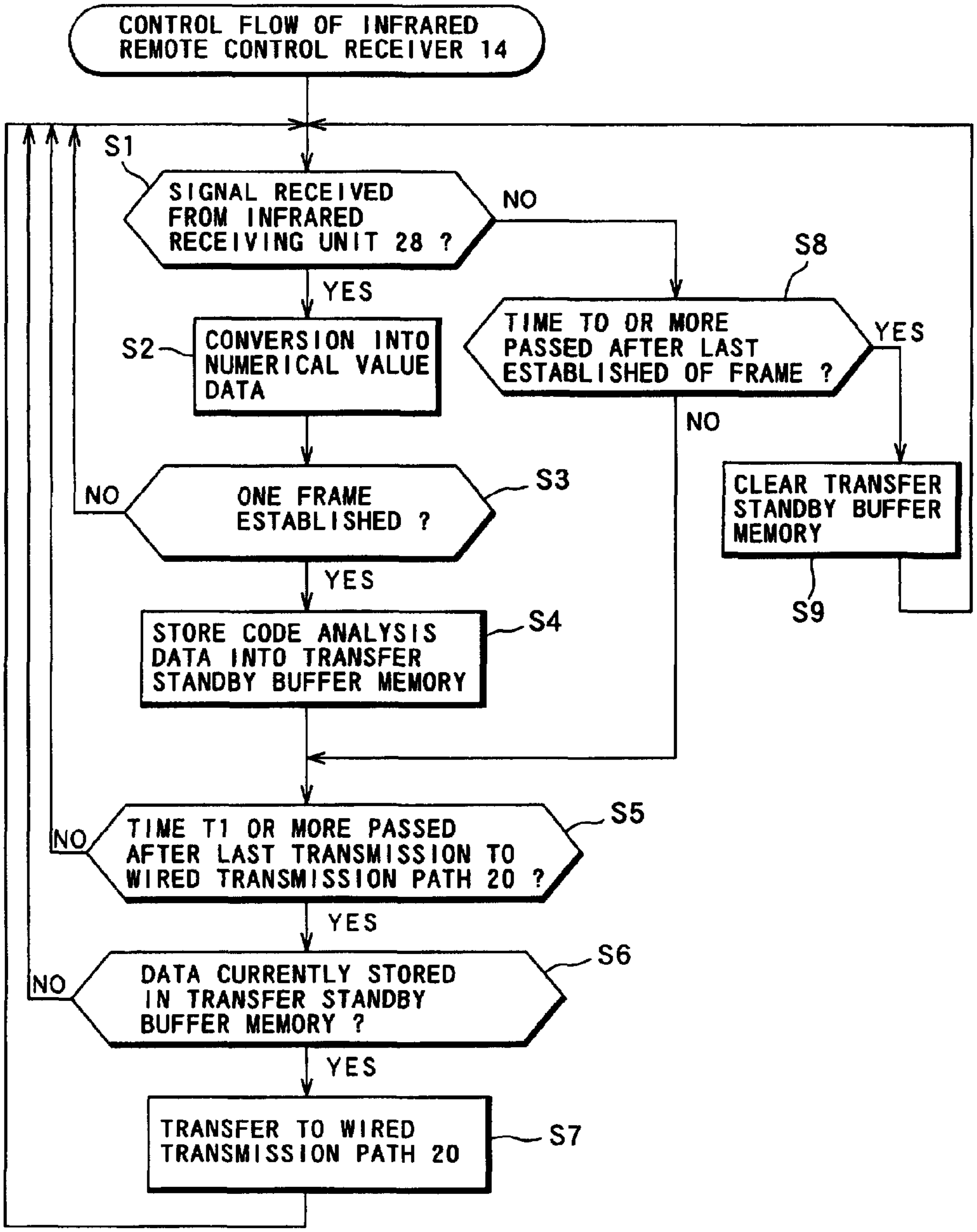
FIG. 6 is a flow chart showing control performed by a CPU of the infrared remote control receiver of FIG. 4.

First, control performed by the CPU 30 of the infrared remote control receiver 14 of FIG. 4 is described with reference to FIG. 6. The infrared remote control receiver 14 transmits code analysis data 23 of one frame of the infrared remote control signal 22 to the wired transmission path 20 with a cyclic period (i.e., second cyclic period) T1 longer than the transmission period T0 of the infrared remote control signal 22, as shown in (b) of FIG. 1. Upon receipt of demodulated code data from the infrared receiving unit 28 (step S1), the CPU 30 performs a process for converting the received signal into numerical value data on a frame-by-frame basis (step S2). Once the numerical value data (i.e., code analysis data 23) of one frame are obtained (step S3), the CPU 30 stores the code analysis data 23 into a transfer standby buffer memory (not shown) (step S4).

When the time T1 or more has passed after the last transmission, to the wired transmission path 20, of the code analysis data 23 (S5) and if the code analysis data 23 are currently stored in the transfer standby buffer memory (S6), the code analysis data 23 are read out from the transfer standby buffer memory (S6) and transferred to the wired transmission path 20 via the transmission path interface 32 (step S7). If code analysis data 23 of the next frame are acquired prior to the passage of the time T0 after the acquisition of the code analysis data 23 of the last frame, the transfer standby buffer memory is updated with the code analysis data 23 of the next frame (steps S1, S2, S3, and S4). If, on the other hand, the code analysis data 23 of the next frame are not acquired or established prior to the passage of the time T0 after the acquisition of the code analysis data 23 of the last frame (step S8), the transfer standby buffer memory is cleared (step S9).

If continuous depressing operation is performed on the infrared remote control transmitter 12, and when a corresponding infrared remote control signal 22 has been received by the infrared remote control receiver 14, the leading operation code C0 of the signal is analyzed and then resultant code analysis data 23 are stored into the above-mentioned transfer standby buffer memory (step S4). Then, the code analysis data 23 are read out from the transfer standby buffer memory (steps S5 and S6) and transmitted to the wired transmission path 20 via the transmission path interface 32 (step S7). Once the time T0 passes after the analysis of the leading operation code C0, the repeat codes C1 of the second and subsequent frames are analyzed at intervals of the time T0, so that the transfer standby buffer memory is updated with the code analysis data 23 every predetermined time T0 (S1, S2, S3 and S4). Then, once the time T1 passes from the last transmission (step S7), to the wired transmission path 20, of the code analysis data (step S5), the code analysis data 23 stored in the transfer standby buffer memory at that time (i.e., code analysis data of the repeat code C1) are read out (step S6) and transmitted to the wired transmission path 20 via the transmission path interface 32 (step S7). In the aforementioned manner, the code analysis data of the code data C0, C1, C1, . . . are sequentially transmitted from the infrared remote control receiver 14 to the wired transmission path 20 as shown in (b) of FIG. 1 at intervals of the cyclic period T1 as long as the continuous depressing operation lasts. Once the continuous depressing operation is terminated and the time T0 passes after the establishment of the last frame (step S3) (YES determination at step S8), the transmission of the code analysis data 23 is brought to an end, and the transfer standby buffer memory is cleared (step S9).

Now, a description will be given about control performed by the CPU 34 of the infrared remote control re-transmitter 16 shown in FIG. 5. Once code analysis data 23 are received from the wired transmission path 20 (step S11), and if the received code analysis data 23 are those of an operation code C0, the CPU 34 restores, from the code analysis data 23, the corresponding operation code C0 (i.e., the same operation code C0 as included in the infrared remote control signal 22 transmitted from the infrared remote control transmitter 12) and then stores the restored operation code C0 into a buffer memory (not shown) within the CPU 34 (steps S12 and S13). Then, upon passage of the time T0 after the last transmission of the infrared remote control signal 24 (YES determination at step S14), the operation code C0 is read out from the buffer memory and transmitted, as code data 35, to the infrared emitting unit 36 (step S15). The infrared emitting unit 36 AM-modulates the transmitted operation code C0 with a carrier wave and transmits the thus-modulated code as an infrared remote control signal 24.

If the code analysis data 23 received from the wired transmission path 20 are those of a repeat code C1 (YES determination at step S12), and when the time T0 has passed after the last transmission of the infrared remote control signal 24 (YES determination at step S16), the corresponding repeat code C1 is transmitted to the infrared emitting unit 36 (S17). Because the repeat code C1 is a code common to each operation key, the repeat code C1 is prestored in a not-shown memory within the infrared remote control re-transmitter 16, so that the repeat code C1 is read out and transmitted to the infrared emitting unit 36 when the repeat code C1 is to be transmitted one or more times upon receipt of the code analysis data of the repeat code C1 and prior to receipt of the first repeat code C1 following receipt of the leading operation code C0. The infrared emitting unit 36 AM-modulates the repeat code C1 with a carrier wave and transmits the thus-modulated code as an infrared remote control signal 24. Therefore, when the code analysis data of the repeat code C1 have been received, no operation is performed here for storing the repeat code C1 into the buffer memory.

After receiving the code analysis data 23 (S11) and transmitting the operation code C0, corresponding to the received code analysis data, to the infrared emitting unit 36 (S15), the CPU 34 performs the following operations in accordance with a type of the operation code C0. Namely, if the operation code C0 is the operation code C0 of the code pattern C0, C1, C1, . . . (i.e., operation code C0 followed by repeat codes C1) generated in response to continuous depressing operation, the CPU 34 reads out, from the not-shown memory, the repeat code C1 as an interpolating code and sends the read-out codes to the infrared emitting unit 36 (step S20) each time the time T0 passes (step S19). If the operation code C0 is the operation code C0 of the code pattern C0, C0, C0, . . . (i.e., operation code C0 followed by operation codes C0) generated in response to continuous depressing operation, the CPU 34 reads out, from, the buffer memory, the operation code C0 as an interpolating code and sends the read-out code to the infrared emitting unit 36 (step S20) each time the time T0 passes (step S19).

In order to perform such case-specific control according to the type of the operation code C0, a memory (not shown) of the infrared remote control re-transmitter 16 has prestored therein information indicating which one of 1) the operation code C0 of the code pattern C0, C1, C1, . . . (i.e., operation code C0 followed by repeat codes C1) generated in response to continuous depressing operation and 2) the operation code C0 of the code pattern C0, C0, C0, . . . (i.e., operation code C0 followed by operation codes C0) generated in response to continuous depressing operation the operation code C0 corresponding to the received code analysis data is. When the code analysis data 23 of the operation code C0 have been received (step S11), the CPU 34 performs the corresponding control with reference to the memory.

If next code analysis data 23 have not been received before the time T1 passes after the receipt of the code analysis data 23 as determined at step S18, the CPU 34 clears the buffer memory at step S21.

When code analysis data 23 of code data C0, C1, C1, . . . have been sequentially sent from the infrared remote control receiver 14 to the wired transmission path 20 at intervals of the cyclic period T1 in response to continuous depressing operation on the infrared remote control transmitter 12, the CPU 34 first receives the code analysis data of the leading operation code C0 (steps S11 and S12), then restores the corresponding operation code C0 (i.e., the same operation code as included in the infrared remote control signal 22 transmitted from the infrared remote control transmitter 12) and then stores the restored operation code C0 into the buffer memory within the CPU 34 (S13). Then, upon passage of the time T0 after the last transmission of the infrared remote control signal 24 as determined at step S14, the CPU 34 reads out the operation code C0 from the buffer memory (step S15) and transmits a corresponding remote control signal 24 via the infrared emitting unit 36.

The infrared remote control re-transmitter 16 does not receive the code analysis data of the repeat code C1 before the time T1 passes from the receipt of the code analysis data of the operation code C0. Thus, before the code analysis data of the repeat code C1 are received, the CPU 34 reads out the repeat code C1 as an interpolating code from the not-shown memory (step S20) each time the time T0 passes (step S19) after the transmission of the operation code C0 (step S19), and then it transmits a corresponding remote control signal 24 via the infrared emitting unit 36. Then, when the code analysis data of the repeat code C1 have been received (step S11), and upon passage of the time T0 after the last infrared emission (step S16), the CPU 34 reads out the repeat code C1 from the not-shown memory (step S17) and transmits a corresponding remote control signal 24 via the infrared emitting unit 36. In this manner, code data C0, C1, C1, . . . are transmitted from the infrared remote control re-transmitter 16 at intervals of the cyclic period T0, as shown in (c) of FIG. 1, as long as the continuous depressing operation lasts. After termination of the continuous depressing operation, and upon passage of the time T1 after the receipt of the last code analysis data C1 (step S18), the transmission of the repeat code C1 as the interpolating code is terminated, the buffer memory is cleared (step S21), and the transmission of the remote control signal 24 via the infrared emitting unit 36 is terminated.

The following paragraphs describe control performed by the infrared remote control receiver 14 and infrared remote control re-transmitter 16 in the case where the infrared remote control transmitter 12 is of the type that transmits an infrared remote control signal 22, generated by modulating code data C0, C0, C0, . . . , with the predetermined cyclic period T0 during continuous depressing operation of a continuously-depressable operation key on the transmitter 12. FIG. 8 shows behavior based on the control of FIGS. 6 and 7.

First, the control performed by the CPU 30 of the infrared remote control receiver 14 will be described with reference to FIG. 6. When an infrared remote control signal 22 generated in response to continuous depressing operation on the infrared remote control transmitter 12 has been received by the infrared remote control receiver 14, the leading operation code C0 is first analyzed, and then resultant code analysis data 23 of the operation code C0 are stored into the transfer standby buffer memory (steps S1, S2, S3 and S4). Then, the code analysis data 23 are read out from the transfer standby buffer memory (steps S5 and S6) and transmitted to the wired transmission path 20 via the transmission path interface 32 (step S7). Then, upon passage of the time T0 after the analysis of the leading operation code C0, the operation codes C0 in and after the second frames are analyzed every predetermined time T0, and the transfer standby buffer memory is updated, every predetermined time T0, with the code analysis data 23 with of the operation code C0 (steps S1, S2, S3 and S4). Then, once the time T1 passes after the last transmission of the code analysis data 23 (step S7) to the wired transmission path 20 as determined at step S5, the code analysis data 23 of the operation code C0 stored in the transfer standby buffer memory at that time are read out (step S6) and transmitted to the wired transmission path 20 via the transmission path interface 32 (step S7). In this manner, the code analysis data 23 of the code data C0, C1, C1, . . . are sequentially sent from the infrared remote control receiver 14 to the wired transmission path 20 at intervals of the cyclic period T1, as shown in (b) of FIG. 8, as long as continuous depressing operation lasts. After termination of the continuous depressing operation, and upon passage of the time T0 (step S8) after the establishment of the last frame (step S3), the transmission of the code analysis data 23 is terminated, and the transfer standby buffer memory is cleared (step S9).

Next, the control performed by the CPU 34 of the infrared remote control re-transmitter 16 will be described with reference to FIG. 7. When the code analysis data 23 of the code data C0, C1, C1, have been sequentially sent from the infrared remote control receiver 14 to the wired transmission path 20 at intervals of the cyclic period T1 in response to continuous depressing operation on the infrared remote control transmitter 12, the code analysis data of the leading operation code C0 are first received (S11 and S12), and the corresponding operation code C0 (i.e., the same operation code C0 as included in the infrared remote control signal 22 transmitted from the infrared remote control transmitter 12) is restored so that the restored operation code is stored into the buffer memory within the CPU 34 (step S13). Then, upon passage of the time T0 after the last transmission of the infrared remote control signal 24 (step S14), the operation code C0 is read out from the buffer memory and transmitted via the infrared emitting unit 36.

As note above, the infrared remote control re-transmitter 16 does not receive the code analysis data of the next operation code C0 before the time T1 passes after the receipt of the code analysis data of the operation code C0. Thus, before the code analysis data of the operation code C0 are received, the CPU 34 reads out the operation code C0 as an interpolating code from the buffer memory (step S20) each time the time T0 passes (step S19) after the transmission of the operation code C0 (step S15), and then it transmits the corresponding infrared remote control signal 24 via the infrared emitting unit 36. Then, after receipt of the next operation code C0 (S11), and upon passage of the time T0 after the last infrared emission (S16), the CPU 34 reads out the operation code C0 from the buffer memory (S17) and transmits the corresponding infrared remote control signal 24 via the infrared emitting unit 36. In this manner, the code data C0, C0, C0, . . . are transmitted from the infrared remote control re-transmitter 16 at intervals of the cyclic period T0 as shown in (c) of FIG. 8. After termination of the continuous depressing operation, and upon passage of the time T1 from receipt of the last code analysis data C1 (step S18), the transmission of the operation code C0 as the interpolating code is terminated, the buffer memory is cleared (step S21), and the transmission of the remote control signal 24 via the infrared emitting unit 36 is terminated.

Figure 7:
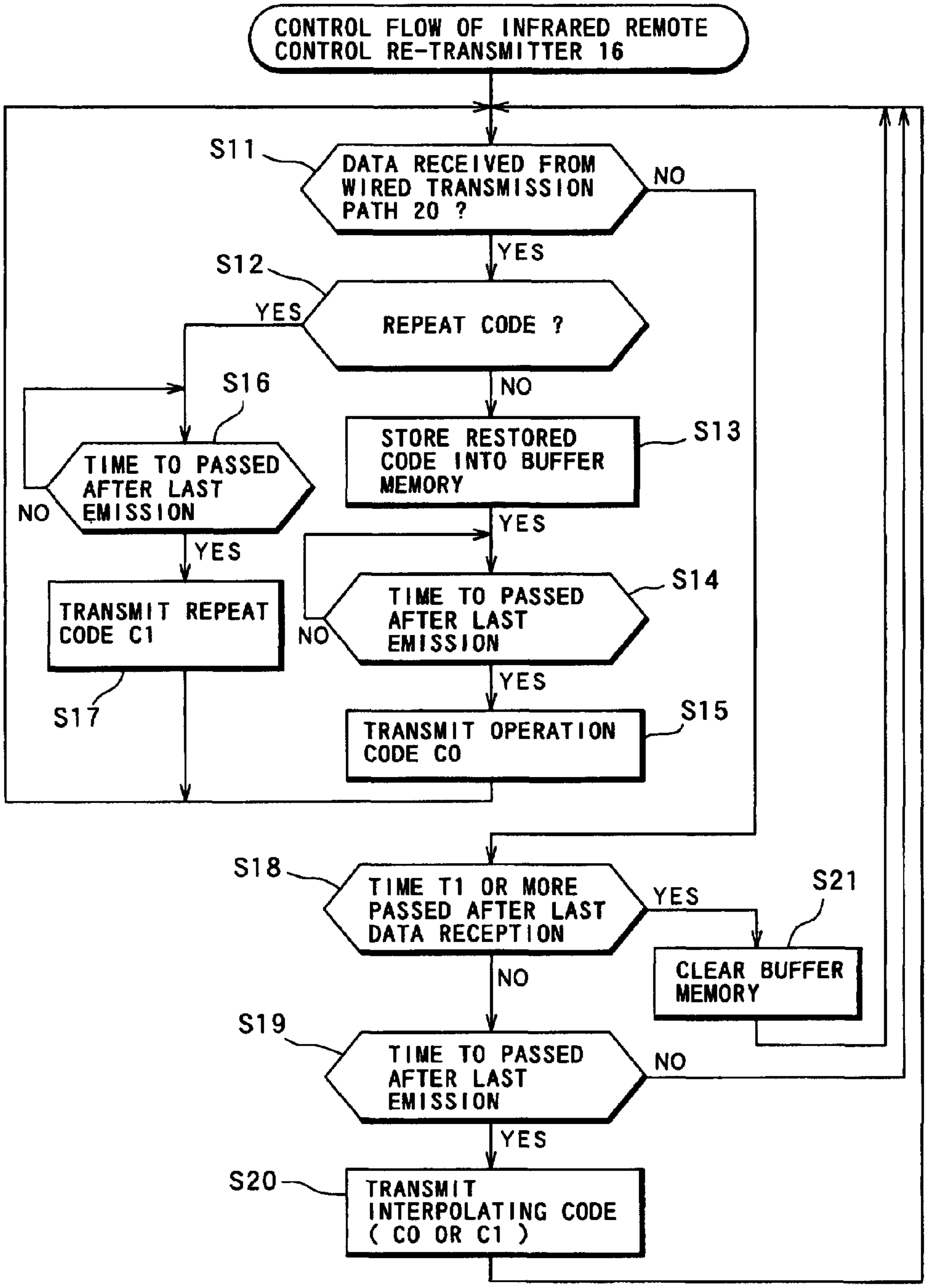
FIG. 7 is a flow chart showing control performed by a CPU of the infrared remote control re-transmitter of FIG. 5.
Figure 8:
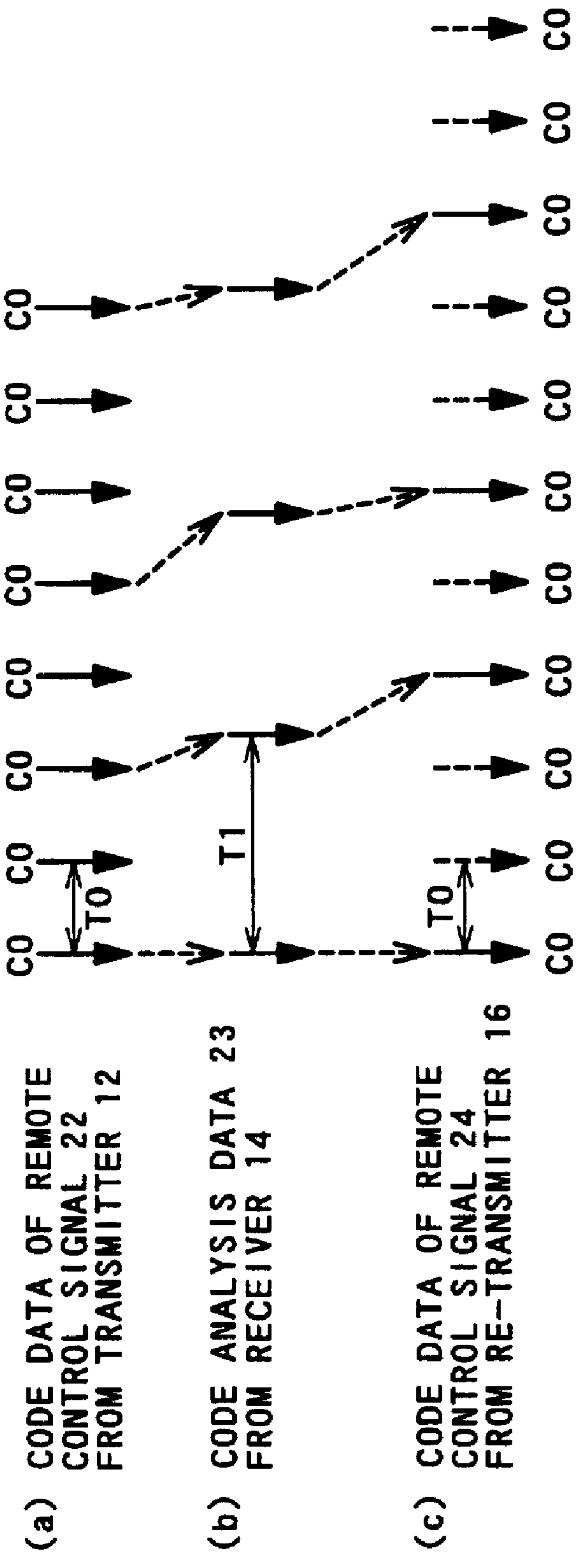
FIG. 8 is a diagram explanatory of behavior based on the control of FIGS. 6 and 7 in a case where a pattern of code data transmitted from the remote control transmitter in response to continuous depressing operation is C0, C0, C0, . . . .

According to the control of FIG. 7, when the human operator has operated an operation key corresponding to the continuous depressing operation function, the repeat code C1 or operation code C0 will be transmitted, from the infrared remote control re-transmitter 16, as an interpolating code, a particular number of times that correspond, at a maximum, to a quotient of T1/T0 (i.e., an integral number m satisfying (m+1)T0>T1>mT0), even if the operation of the key is not continuous depressing operation. Also, when the human operator has continuously operated an operation key corresponding to the continuous depressing operation function, repeat codes C1 or operation codes C0 are transmitted, from the infrared remote control re-transmitter 16, as interpolating codes that correspond in number to the integral number m at a maximum. However, in either case, unless the integral number m is a very great value (i.e., unless the time T1 is very long), the continuous depressing operation function does not last for a long time on the operated equipment 18 after termination of the operation of the key, so that the operation will not give any uncomfortable feeling to the user or human operator.

What is claimed is:

1. A wireless remote control signal transfer method comprising:

a reception step of receiving a wireless remote control signal repetitively transmitted by a wireless remote control transmitter with a first cyclic period while one given operation is being continuously performed on the wireless remote control transmitter;

a step of analyzing the wireless remote control signal, received by said reception step, to provide code analysis data of the wireless remote control signal and repetitively transmitting the code analysis data of the wireless remote control signal to a wired transmission path with a second cyclic period, longer than said first cyclic period, as long as reception of the wireless remote control signal lasts with said first cyclic period;

a re-transmission step of receiving the code analysis data from the wired transmission path and repetitively re-transmitting a wireless remote control signal, corresponding to the received code analysis data and also representing the wireless remote control signal transmitted by the wireless remote control transmitter, with said first cyclic period as long as reception of the code analysis data lasts with said second cyclic period; and a step of causing the wireless remote control signal, re-transmitted by said re-transmission step, to be received by operated equipment remote-controlled by the wireless remote control signal transmitter.

2. A wireless remote control signal transfer apparatus including a wireless remote control receiver, a wireless remote control re-transmitter, and a wired transmission path interconnecting the wireless remote control receiver and the wireless remote control re-transmitter, said wireless remote control receiver receiving a wireless remote control signal repetitively transmitted by a wireless remote control transmitter with a first cyclic period while one given operation is being continuously performed on the wireless remote control transmitter, said wireless remote control receiver also analyzing the received wireless remote control signal to provide code analysis data of the wireless remote control signal and transmitting the code analysis data of the wireless remote control signal to the wired transmission path with a second cyclic period, longer than said first cyclic period, as long as reception of the wireless remote control signal lasts with said first cyclic period, said wireless remote control re-transmitter receiving the code analysis data from the wired transmission path and repetitively re-transmitting a wireless remote control signal, corresponding to the received code analysis data and also representing the wireless remote control signal transmitted by the wireless remote control transmitter, with said first cyclic period as long as reception of the code analysis data lasts with said second cyclic period.

3. A wireless remote control signal transfer apparatus as claimed in claim 2 wherein, while one given operation is being continuously performed on the wireless remote control transmitter and when said wireless remote control re-transmitter has received the code analysis data of an operation code of a leading frame of a wireless remote control signal of a type where a repeat code is repetitively transmitted in and after a second frame following the operation code of the leading frame, said wireless remote control re-transmitter re-transmits the operation code in a leading frame and repetitively re-transmits the repeat code in and after a second frame, and while one given operation is being continuously performed on the wireless remote control transmitter and when said wireless remote control re-transmitter has received the code analysis data of an operation code of the leading frame of a wireless remote control signal of a type where an operation code is repetitively transmitted in all frames, said wireless remote control re-transmitter re-transmits the operation code in all frames.

4. A wireless remote control signal transfer apparatus including a wireless remote control receiver, a wireless remote control re-transmitter, and a wired transmission path interconnecting the wireless remote control receiver and the wireless remote control re-transmitter, said wireless remote control receiver receiving a wireless remote control signal repetitively transmitted by a wireless remote control transmitter with a first cyclic period while one given operation is being continuously performed on the wireless remote control transmitter, said wireless remote control receiver also analyzing the received wireless remote control signal to provide code analysis data of the wireless remote control signal and transmitting the code analysis data of the wireless remote control signal to the wired transmission path with a second cyclic period, longer than said first cyclic period, as long as reception of the wireless remote control signal lasts with said first cyclic period, said wireless remote control re-transmitter receiving the code analysis data from the wired transmission path and repetitively re-transmitting a wireless remote control signal, corresponding to the received code analysis data and also representing the wireless remote control signal transmitted by the wireless remote control transmitter, with said first cyclic period as long as reception of the code analysis data lasts with said second cyclic period wherein, while said wireless remote control re-transmitter is continuously receiving the code analysis data from the wired transmission path with said second cyclic period, said wireless remote control re-transmitter repetitively re-transmits, with said first cyclic period and a particular number of times, a wireless remote control signal, corresponding to newest received code analysis data and also representing the wireless remote control signal transmitted by the wireless remote control transmitter, within a particular time period prior to receipt of next code analysis data and following re-transmission of the wireless remote control signal based on the code analysis data received immediately before the newest received code analysis data, said particular number of times corresponding, at a maximum, to a quotient obtained by diving said second cyclic period by said first cyclic period.

5. A wireless remote control signal transfer apparatus as claimed in claim 4, wherein while one given operation is being continuously performed on the wireless remote control transmitter and when said wireless remote control re-transmitter has received the code analysis data of an operation code of a leading frame of a wireless remote control signal of a type where a repeat code is repetitively transmitted in and after a second frame following the operation code of the leading frame, said wireless remote control re-transmitter re-transmits the operation code in a leading frame and repetitively re-transmits the repeat code in and after a second frame, and while one given operation is being continuously performed on the wireless remote control transmitter and when said wireless remote control re-transmitter has received the code analysis data of an operation code of the leading frame of a wireless remote control signal of a type where an operation code is repetitively transmitted in all frames, said wireless remote control re-transmitter re-transmits the operation code in all frames.

6. A wireless remote control system comprising:

a wireless remote control transmitter that transmits a wireless remote control signal responsive to operation by a user;

a wireless remote control receiver that analyzes the wireless remote control signal, transmitted by the wireless remote control transmitter, to provide code analysis data of the wireless remote control signal and transmits the code analysis data of the wireless remote control signal to a wired transmission path;

a wireless remote control re-transmitter that receives the code analysis data transmitted to the wired transmission path and transmits a wireless remote control signal, corresponding to the received code analysis data and also representing the wireless remote control signal transmitted by said wireless remote control transmitter; and operated equipment to be remote-controlled via said wireless remote control transmitter, said operated equipment analyzing the wireless remote control signal transmitted by said wireless remote control re-transmitter and performing a process corresponding to an analysis result of the wireless remote control signal wherein while one given operation is being continuously performed on said wireless remote control transmitter and when said wireless remote control receiver has received a wireless remote control signal repetitively transmitted by said wireless remote control transmitter with a first cyclic period, said wireless remote control receiver transmits code analysis data of the wireless remote control signal to the wired transmission path with a second cyclic period longer than said first cyclic period, and when said wireless remote control re-transmitter has received the code analysis data transmitted to the wired transmission path, said wireless remote control re-transmitter transmits the wireless remote control signal corresponding to the received code analysis data and also repetitively transmits the wireless remote control signal with said first cyclic period for a time period up to immediately before a predetermined time corresponding to said second cyclic period passes after receipt of the code analysis data.

* * * * *